United States Patent [19]

Jabarin

[11] Patent Number: 4,578,295

[45] Date of Patent: Mar. 25, 1986

[54] HIGH BARRIER POLYMER BLEND AND ARTICLES PREPARED THEREFROM

[75] Inventor: Saleh A. Jabarin, Holland, Ohio

[73] Assignee: Owens-Illinois, Inc., Toledo, Ohio

[21] Appl. No.: 631,263

[22] Filed: Jul. 16, 1984

[51] Int. Cl.⁴ .................... B65D 1/00; C08F 20/00
[52] U.S. Cl. ........................ 428/35; 525/444;
528/173; 528/176; 528/193; 428/542.8
[58] Field of Search ............... 525/444; 428/35, 542.8;
215/1 C; 528/173, 176, 193

[56] References Cited

U.S. PATENT DOCUMENTS

| | | | |
|---|---|---|---|
| 4,261,473 | 4/1981 | Yamada et al. | 428/35 |
| 4,284,671 | 8/1981 | Cancio et al. | 428/35 |
| 4,398,017 | 8/1983 | Go | 528/173 |
| 4,414,230 | 11/1983 | Hanabata et al. | 428/35 |
| 4,469,851 | 9/1984 | Charles et al. | 525/444 |

Primary Examiner—John E. Kittle
Assistant Examiner—James J. Seidleck
Attorney, Agent, or Firm—Philip M. Rice

[57] ABSTRACT

A polyester based intimate fusion blended composition comprising an admixture of a poly(ethylene terephthalate) and a copolyester of isophthalic and terephthalic acid, ethylene glycol and 1,3 bis(2-hydroxyethoxy)benzene is disclosed. The novel material disclosed is suitable for fabrication into container parison, hollow containers, sheet stock and film. Such articles exhibit excellent gas barrier properties, mechanical strength and processability.

15 Claims, 5 Drawing Figures

HIGH BARRIER POLYMER BLEND AND ARTICLES PREPARED THEREFROM

BACKGROUND OF THE INVENTION

Liquid storage containers blow-molded from polyesters, particularly poly(ethylene terephthalate) are easily fabricated at reasonable cost and have received wide acceptance in the market place as containers suitable for storing many liquids. The use of such polyester containers to package liquids having a sensitivity to oxygen or liquids requiring internal pressurization by the addition of carbon dioxide has been somewhat restricted, however, by reason of the fact that most polyesters, and particularly poly(ethylene terephthalate), allow significant ingress of environmental oxygen and significant egress of carbon dioxide to and from the package contents. In many circumstances like soft drink packaging, beer packaging and wine packaging, the barrier characteristics have significantly reduced the utility of polyester based containers.

In the past, a number of approaches have been used to attempt to solve the poor barrier properties of polyester resins. Various barrier polymers have been admixed with polyesters in an attempt to improve container performance. Unfortunately, resin expense or only marginally superior results in respect of physical properties and barrier characteristics compared to native polyesters have been experienced. Notably, such admixtures show significant moisture sensitivity and are not optically clear when blow molded.

Similarly, many chemically modified polyesters have been developed in an attempt to overcome the relatively poor barrier properties of the polyesters by adding various functional groups to the polymer chain. Unfortunately, costs, or processing characteristics, poor barrier properties or poor mechanical strength have significantly reduced the acceptance of these materials in the market place.

Accordingly, there is a need in the art for an improved polyester-based resin blend which is capable of being injection-molded, providing a high gas and water vapor transmission barrier, excellent mechanical properties, low sensitivity to barrier performance loss when exposed to moisture, low acetaldehyde levels upon processing for use of foodstuffs as well as being optically clear when blow-molded and capable of being strain-hardened upon molecular orientation by blow-molding.

SUMMARY OF THE INVENTION

The present invention provides an intimate fusion blend of two different polyester materials having an advantageous balance of mechanical properties and gas and water barrier making the new intimate fusion blend well-suited for conversion into container parisons and a variety of container shapes by blow-molding as well as thermoforming of films into packaging. The polyester-based intimate fusion blend materials according to the present invention are injection-moldable, provide excellent gas and moisture barrier, maintain mechanical properties and are optically clear upon blow-molding in addition to producing very low levels of acetaldehyde during blow-molding at conventional processing temperatures. Also, the new material can be oriented and is strain-hardenable during orientation blow-molding conditions to produce excellent rigid containers. Further, upon exposure to moisture, the material does not exhibit a significant decline in gas barrier properties.

The polyester-based intimate fusion blended compositions according to the present invention comprise an admixture of a poly(ethylene terephthalate) and a copolyester. The preferred copolyester material is a copolyester of isophthalic or terephthalic acid, ethylene glycol and 1,3 bis(2-hydroxyethoxy)benzene. The composition may also include small amounts of bis (4-beta-hydroxyethoxyphenyl) sulfone when it is desired to elevate the glass transition temperature of the copolyester component of the blend.

The intimate fusion blends according to the present invention are suitable for forming injection molded container parisons and the hollow containers therefrom, particularly by blow-molding of bottles or thermoforming for deep drawn food trays or for producing sheetstock or film, all having excellent barrier properties, mechanical strength and processability with low acetaldehyde levels. The new composition can be conveniently used to make small containers by injection blow molding or larger containers by injection, cool, reheat and blow techniques. The material when used to injection-blow mold small containers without the induction of significant amounts of molecular orientation shows barrier properties with respect to $CO_2$ and $O_2$ transmission, as well as water vapor transmission, comparable to biaxially oriented poly(ethylene terephthalate). In the use where parisons are injection molded, cooled for storage and subsequently reheated to orientation temperature and blow molded to induce molecular orientation the resultant containers show significantly improved $CO_2$ and $O_2$ barrier as compared to conventional biaxially oriented poly(ethylene terephthalate) containers of equivalent size, shape and thickness characteristics.

BRIEF DESCRIPTION OF THE DRAWINGS

The details of the invention will be described in the accompanying specification in view of the drawings, in which.

DETAILED DESCRIPTION OF THE INVENTION

Figure 1:
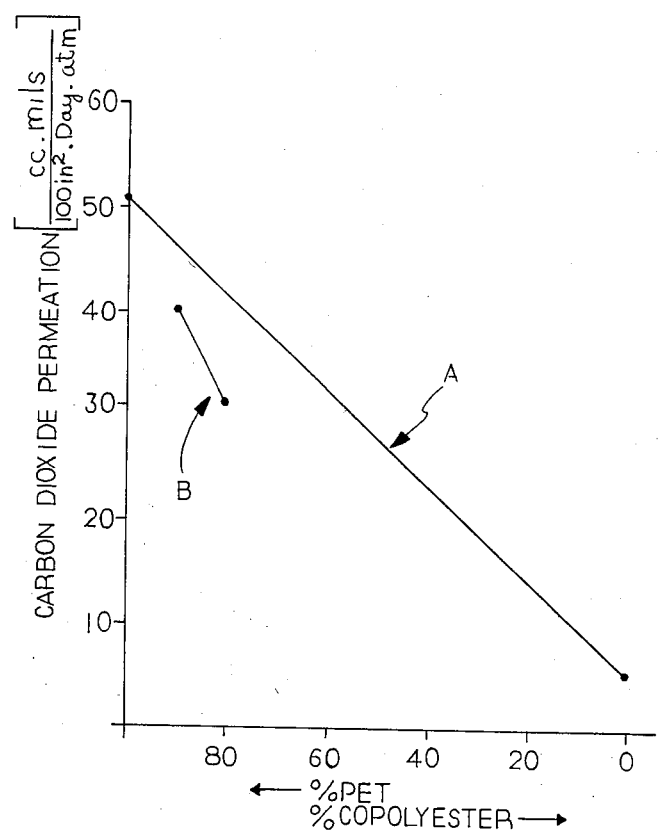
FIG. 1 is a graphical representation of the $CO_2$ gas transmission characteristics of poly(ethylene terephthalate) and copolyester compared to the compositions according to the invention.

The polyester-based intimate fusion blend compositions according to the present invention comprise an admixture of a poly(ethylene terephthalate), hereinafter referred to as PET, and a copolyester.

The preferred PET material, according to the present invention is formed from the reaction between ethylene glycol and terephthalic acid or an ester thereof, particularly dimethyl terephthalate, and has an inherent viscosity of at at least 0.6. Other PET materials useful herein are poly(ethylene terephthalate) polymers including polymers where at least 97% of the polymer contains the repeating ethylene terephthalate units with the remainder being minor amounts of ester-forming components, and copolymers of ethylene terephthalate wherein up to about 10 mole percent of the polymer is prepared from the monomer units selected from butane-1,4-diol; diethylene glycol; propane-1,3-diol; poly(tetramethylene glycol); poly(propylene glycol); 1,4-hydroxymethylcyclohexane and the like, substituted for the glycol moiety in the preparation of the polymer, or isophthalic; naphthalene,1,4- or 2,6- dicarboxylic; adipic; sebacic; decane-1,10-dicarboxylic acids, and the like, substituted for up to 10 mole percent of the acid moiety (terephthalic acid) in the preparation of the polymer.

Of course, the poly(ethylene terephthalate) polymer can include various additives that do not adversely affect the polymer. For instance, some such additives are stabilizers, e.g., antioxidants or ultraviolet light screening agents, extrusion aids, additives designed to make the polymer more degradable or combustable, and dyes or pigments. Moreover, cross-linking or branching agents such as are disclosed in U.S. Pat. No. 4,188,357 can be included in small amounts in order to increase the melt strength of the poly(ethylene terephthalate).

The copolyesters, which form the polyester-based intimate fusion blend composition when admixed with PET according to the present invention, are copolyesters based on terephthalic or isophthalic acid or both, ethylene glycol and which contain 1,3 bis(2-hydroxyethoxy)benzene as one of the diol reactants in order to prepare the solid copolyesters for admixture with PET.

The solid theremoplastic copolyesters are formed of the polymeric reaction product of:

(A) reactant(s) selected from isophthalic acid, terephalic acid, and their $C_1$ to $C_4$ alkyl esters, and any mixture thereof in any proportion, (B) reactants, 1,3 bis(2-hydroxyethoxy)benzene plus ethylene glycol, and optionally one or more other ester forming dihydroxy organic hydrocarbon reactant(s), and, optionally, (C) reactant, bis(4-beta-hydroxyethoxyphenyl) sulfone, wherein:

(1) the amount of said 1,3 bis(2-hydroxyethoxy)benzene is 5-90 mole percent of the amount of (A) reactants, usually not less than 10 or more than 80, mole percent of the amount of A reactants, (2) the combined amount of B and C reactant is about 110 to 300 mole percent of the amount of A reactants, (3) the amount of said other ester forming dihydroxy organic hydrocarbon reactant(s) is zero to 20, usually zero to 15, mole percent of the amount of said A reactants, and (4) the combined amount of said (C) reactant plus said 1,3 bis(2-hydroxyethoxy)benzene and said other ester forming dihydroxy organic hydrocarbon reactant(s) is not over 90 mole percent of said A reactants.

In the foregoing copolyesters the optional (C) reactant, bis(4-beta-hydroxyethoxyphenyl) sulfone, is used when it is necessary to raise the glass transition temperature of the copolyester composition portion of the PET-copolyester blend composition for a particular application.

When less than 5 mol percent of 1,3 bis(2-hydroxyethoxy) benzene is used, the effect on permeabilities is not as significant as desired. When over 90 mol percent is used, the reaction or polycondensation rate is lower then desired.

The copolyesters so produced are solid copolyesters having an inherent viscosity of about 0.4 dl/g., usually at least 0.5 and for most commercial applications, at least 0.7 dl/g. The inherent viscosities referred to herein are those measured at 25° C., using a solution of 0.25 gms. of polymer dissolved in 100 milliliters of a mixture of 3 weight parts phenol with 2 weight parts 1,1,2,2 tetrachloroethane.

The glass transition temperature, Tg, was determined using a Perkin-Elmer Differential Scanning Calorimeter, Model DSC-2, in a manner similar to that described in U.S. Pat. No. 3,822,322, issued July 2, 1974, using a heating rate of 10° C./minute.

The following Examples are illustrative of the formation of the polyesters according to the present invention.

EXAMPLE 1

Into a 1-liter stainless steel reactor equipped with a stirrer, nitrogen gas inlet port and a condenser, the following were added:

| | |
|---|---|
| 233 g | dimethyl terephthalate |
| 167.6 g | ethylene glycol |
| 59.4 g | 1,3 bis(2-hydroxyethoxy)benzene |
| 0.0660 g | titanyl acetylacetonate |
| 0.0874 g | $Sb_2O_3$ |
| 0.0303 g | manganese hypophosphite monohydrate |
| 0.0114 g | tetrasodium ethylenediaminetetraacetate |
| 0.4325 g | 1,1,1 tris hydroxymethyl ethane |

The reaction mixture was heated at 200° C. for 1 hour and 20 minutes under nitrogen atmosphere. Methanol was continuously distilled out during this period. Then 0.4128 g of tris(nonylphenyl)phosphite was added to the mixture in the reactor. The reaction temperature was increased to 250° C. and maintained for 1 hour under nitrogen atmosphere. Then the nitrogen gas flow was stopped and a vacuum of less than 0.4 mm Hg was applied. The reaction was continued at 275° C. under less than 0.4 mm Hg for 2 hours, 50 minutes. The copolyester had an inherent viscosity of 0.86 dl/g. The glass transition temperature was 72° C. The $O_2$ and $CO_2$ gas permeabilities were 5.9 and 35.8 cc./mil per 100 in.$^2$/day/atm., respectively.

EXAMPLE 2

Poly(ethylene terephalate) was prepared as follows:
Into a 500 ml 3-necked round bottom flask, equipped with a nitrogen gas inlet tube, stirrer and a condenser, the following compounds were added:

| | |
|---|---|
| 46.5 g | dimethyl terephthalate |
| 35.4 g | ethylene glycol |
| 0.0263 g | zinc acetate dihydrate |
| 0.01398 g | antimony trioxide |

The contents of the flash were heated at 220° C. under nitrogen atmosphere for 3 hours. During this time, methanol was distilled off. Then the reaction temperature was raised to 280° C., nitrogen flow was stopped and vacuum was gradually applied until less than 0.5 mm Hg. Excess ethylene glycol was continuously distilled off. The reaction was stopped after 4 hours. The inherent viscosity was 0.83, the glass transition temperature was 72° C., the oxygen permeability was 8.5 cc./mil per 100 in.$^2$/day/atm. and the carbon dioxide permeability was 55.3 cc./mil per 100 in.$^2$/day/atm.

EXAMPLE 3

Into a 1-liter stainless steel reactor equipped with a stirrer, nitrogen gas inlet port and a condenser, the following were added:

| | |
|---|---|
| 233.0 g | dimethyl terephthlate |
| 134.1 g | ethylene glycol |
| 166.3 g | 1,3 bis(2-hydroxyethoxy)benzene |
| 0.4325 g | 1,1,1 tris(hydroxymethyl)ethane |
| 0.0114 g | titanyl acetylacetonate |
| 0.0874 g | Sb$_2$O$_3$ |
| 0.0114 g | tetrasodium ethylenediaminetetraacetate |
| 0.0303 g | manganese hypophosphite monohydrate |

The reaction mixture was heated at 200° C. for 1 hour under nitrogen atmosphere. Methanol was continuously distilled out during this period. Then 0.4128 g of tris (nonylphenyl)phosphite was added to the mixture in the reactor. The reaction temperature was increased to 250° C. and maintained for 55 minutes under nitrogen atmosphere. Then the nitrogen gas flow was applied. The reaction was continued at 270° C. under less than 0.4 mm Hg for 5½ hours. The copolyester had an inherent viscosity of 0.65. The glass transition temperature was 64° C. The O$_2$ and CO$_2$ gas permeabilities were 3.8 and 22.4 cc./mil per 100 in.$^2$/day/atm., respectively.

EXAMPLE 4

Into a 1-liter stainless steel reactor equipped with a stirrer, nitrogen gas inlet port and a condenser, the following were added:

| | |
|---|---|
| 332.3 g | isophthalic acid |
| 192.2 g | ethylene glycol |
| 19.8 g | 1,3 bis(2-hydroxyethoxy)benzene |
| 0.1100 g | titanyl acetylacetonate |
| 0.1458 g | Sb$_2$O$_3$ |
| 0.0190 g | tetrasodium ethylenediaminetetraacetate |
| 0.7209 g | 1,1,1 tris(hydroxymethyl)ethane |

The reaction mixture was heated at 220° C. for 1 hour, and then at 240° C. for 40 minutes under nitrogen atmosphere. Water was continuously distilled out during this period. Then 0.688 g of tris (nonylphenyl)phosphite was added to the mixture in the reactor. The reaction temperature was increased to 250° C. and maintained for 50 minutes under nitrogen atmosphere. Then the nitrogen gas flow was stopped and a vacuum of less than 0.4 mm Hg was applied. The reaction was continued at 270° C. under less than 0.4 mm Hg for 3 hours, 55 minutes. The copolyester had an inherent viscosity of 0.83. The glass transition temperature was 61° C. The O$_2$ and CO$_2$ gas permeabilities were 1.6 and 7.1 cc./mil per 100 in.$^2$/day/atm., respectively.

EXAMPLE 5

Into a 1-liter stainless steel reactor equipped with a stirrer, nitrogen gas inlet port and a condenser, the following were added:

| | |
|---|---|
| 332.3 g | isophthalic acid |
| 180 g | ethylene glycol |
| 59.4 g | 1,3 bis(2-hydroxyethoxy)benzene |
| 0.7209 g | 1,1,1 tris(hydroxymethyl)ethane |
| 0.1100 g | titanyl acetylacetonate |
| 0.1458 g | Sb$_2$O$_3$ |
| 0.019 g | tetrasodium ethylenediaminetetraacetate |

The reaction mixture was heated at 220° C. for 1 hour, and then at 240° C. for 30 minutes under nitrogen atmosphere. Water was continuously distilled out during this period. Then 0.688 g of tris(nonylphenyl)phosphite was added to the mixture in the reactor. The reaction temperature was increased to 250° C. and maintained for 40 minutes under nitrogen atmosphere. Then the nitrogen gas flow was stopped and a vacuum of less than 0.4 mm Hg was applied. The reaction was continued at 270° C. under less than 0.4 mm Hg for 4½ hours. The copolyester had an inherent viscosity of 0.82. The glass transition temperature was 60° C. The O$_2$ and CO$_2$ gas permeabilities were 1.6 and 6.6 cc./mil per 100 in.$^2$/day/atm., respectively.

EXAMPLE 6

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 107.9 g | ethylene glycol |
| 35.6 g | 1,3 bis(2-hydroxyethoxy)benzene |
| 0.4325 g | 1,1,1 tris(hydroxymethyl)ethane |
| 0.066 g | titanylacetonate |
| 0.0874 g | Sb$_2$O$_3$ |
| 0.0114 g | tetrasodium ethylenediaminetetraacetate |
| 0.0303 g | manganese hypophosphite monohydrate |

The reaction mixture was heated at 220° C. for 1 hour, and then at 240° C. for 25 minutes under nitrogen atmosphere. Water was continuously distilled out during this period. The 0.1862 g of tris(nonylphenyl)phosphite was added to the mixture in the reactor. The reaction temperature was increased to 250° C. and maintained for 35 minutes under nitrogen atmosphere. Then the nitrogen gas flow was stopped and a vacuum of less than 0.4 mm Hg was applied. The reaction was continued at 275° C. under less than 0.4 mm Hg for 4 hours, 5 minutes. The copolyester has an inherent viscosity of 0.89. The glass transition temperature was 63° C. The O$_2$ and CO$_2$ gas permeabilities were 2.0 and 9.7 cc./mil per 100 in.$^2$/day/atm., respectively.

EXAMPLE 7

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 100.4 g | ethylene glycol |
| 35.6 g | 1,3 bis(2-hydroxyethoxy)benzene |
| 40.6 g | bis(4-beta-hydroxyethoxyphenyl)sulfone |
| 0.4325 g | 1,1,1 tris(hydroxymethyl)ethane |
| 0.0660 g | titanylacetylacetonate |
| 0.0874 g | Sb$_2$O$_3$ |
| 0.0114 g | tetrasodium ethylenediaminetetraacetate |
| 0.0303 g | manganese hypophosphite monohydrate |

The reaction mixture was heated at 200° C. for 20 minutes, and then at 240° C. for 50 minutes under nitrogen atmosphere. Water was continuously distilled out during this period. Then 0.4128 g of tris(nonylphenyl)-phosphite was added to the mixture in the reaactor. The reaction temperature was increased to 250° C. and maintained for 25 minutes under nitrogen atmosphere. Then the nitrogen gas flow was stopped and a vacuum of less than 0.4 mm Hg was applied. The reaction was continued at 270° C. under less than 0.4 mm Hg for 4 hours. The copolyester had an inherent viscosity of 0.77. The glass transition temperature was 72° C. The $O_2$ and $CO_2$ gas permeabilities were 2.5 and 12.9 cc./mil per 100 in.$^2$/day/atm., respectively.

EXAMPLE 8

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 100.4 g | ethylene glycol |
| 35.6 g | 1,3 bis(2-hydroxyethoxy)benzene |
| 17.3 g | 1,4 trans cyclohexanedimethanol |
| 0.0660 g | titanylacetylacetonate |
| 0.0874 g | $Sb_2O_3$ |
| 0.0114 g | tetrasodium ethylenediaminetetraacetate |
| 0.0303 g | manganese hypophosphite monohydrate |
| 0.4325 g | 1,1,1 tris(hydroxymethyl)ethane |

The reaction mixture was heated at 200° C. for 1 hour, and then at 240° C. for 1 hour under nitrogen atmosphere. Water was continuously distilled out during this period. Then 0.4128 g of tris(nonylphenyl)-phosphite was added to the mixture in the reaactor. The reaction temperature was increased to 250° C. and maintained for 30 minutes under nitrogen atmosphere. Then the nitrogen gas flow was stopped and a vacuum of less than 0.4 mm Hg was applied. The reaction was continued at 270° C. under less than 0.4 mm Hg for 4 hours. The copolyester had in inherent viscosity of 0.81. The glass transition temperature was 63° C. The $O_2$ and $CO_2$ gas permeabilities were 3.3 and 15.3 cc./mil per 100 in.$^2$/day/atm., respectively.

EXAMPLE 9

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 78.2 g | ethylene glycol |
| 35.6 g | 1,3 bis(2-hydroxyethoxy)benzene |
| 12.5 g | neopentyl glycol |
| 0.4325 g | 1,1,1 tris(hydroxymethyl)ethane |
| 0.0660 g | titanylacetylacetonate |
| 0.0874 g | $Sb_2O_3$ |
| 0.0114 g | tetrasodium ethylenediaminetetraacetate |
| 0.0303 g | manganese hypophosphite monohydrate |

The reaction mixture was heated at 240° C. for 1 hour under 35 psi nitrogen atmosphere, and then the pressure was lowered to atmospheric. Water was continuously distilled out during this period. Then 0.4128 g of tris(-nonylphenyl)phosphite was added to the mixture in the reaactor. The reaction temperature was increased to 250° C. and maintained for 20 minutes under nitrogen atmosphere. Then the nitrogen gas flow was stopped and a vacuum of less than 0.4 mm Hg was applied. The reaction was continued at 270° C. under less than 0.4 mm Hg for 4 hours. The copolyester had an inherent viscosity of 0.90. The glass transition temperature was 65° C. The $O_2$ and $CO_2$ gas permeabilities were 3.0 and 10.2 cc./mil per 100 in.$^2$/day/atm., respectively.

EXAMPLE 10

Into a 1-liter stainless steel reaactor equipped with a stirrer, nitrogen gas inlet port and a condenser, the following were added:

| | |
|---|---|
| 179.4 g | isophthalic acid |
| 19.9 g | terephthalic acid |
| 78.2 g | ethylene glycol |
| 35.6 g | 1,3 bis(2-hydroxyethoxy)benzene |
| 17.8 g | diethylene glycol |
| 0.0660 g | titanylacetylacetonate |
| 0.0874 g | $Sb_2O_3$ |
| 0.4325 g | 1,1,1 tris(hydroxymethyl)ethane |
| 0.0114 g | tetrasodium ethylenediaminetetraacetate |
| 0.0303 g | manganese hypophosphite monohydrate |

The reaction mixture was heated at 240° C. for 1 hour under 35 psi nitrogen atmosphere, and then the pressure was lowered to atmospheric. Water was continuously distilled out during this period. Then 0.4128 g of tris(-nonylphenyl)phosphite was added to the mixture in the reaactor. The reaaction temperature was increased to 250° C. and maintained for 20 minutes under nitrogen atmosphere. Then the nitrogen gas flow was stopped and a vacuum of less than 0.4 mm Hg was applied. The reaction was continued at 270° C. under less than 0.4 mm Hg for 5 hours. The copolyester had an inherent viscosity of 0.84. The glass transition temperature was 59° C. The $O_2$ and $CO_2$ gas permeabilities were 2.3 and 11.3 cc./mil per 100 in.$^2$/day/atm., respectively.

EXAMPLE 11

Into a 1-liter stainless steel reactor equipped with a stirrer, nitrogen gas inlet port and a condenser, the following were added:

| | |
|---|---|
| 199.3 g | isophthalic acid |
| 89.4 g | ethylene glycol |
| 213.8 g | 1,3 bis(2-hydroxyethoxy)benzene |
| 0.4325 g | 1,1,1 tris(hydroxymethyl)ethane |
| 0.0660 g | titanylacetylacetonate |
| 0.0874 g | $Sb_2O_3$ |
| 0.0114 g | tetrasodium ethylenediaminetetraacetate |
| 0.0303 g | manganese hypophosphite monohydrate |

The reaction mixture was heated at 200° C. for ½ hour, and then at 240° C. for 1 hour under nitrogen atmosphere. Water was continuously distilled out during this period. Then 0.4128 g of tris(nonylphenyl)-phosphite was added to the mixture in the reaactor. The reaction temperature was increased to 250° C. and maintained for 40 minutes under nitrogen atmosphere. Then the nitrogen gas flow was stopped and a vacuum of less than 0.4 mm Hg was applied. The reaction was continued at 275° C. under less than 0.4 mm Hg for 5½ hours. The copolyester had an inherent viscosity of 0.45.

EXAMPLE 12

Into a 1-liter stainless steel reactor equipped with a stirrer, nitrogen gas inlet port and a condenser, the following were added:

| | |
|---|---|
| 224.3 g | isophthalic acid |
| 24.9 g | terephthalic acid |
| 148.9 g | ethylene glycol |
| 44.55 g | 1,3 bis(2-hydroxyethoxy)benzene |
| 0.08253 g | titanyl acetylacetonate |
| 0.10928 g | $Sb_2O_3$ |
| 0.5407 g | 1,1,1 tris(hydroxymethyl)ethane |
| 0.01425 g | tetrasodium ethylenediaminetetraacetate |
| 0.03776 g | Mm $(H_2PO_2)_2$—$2H_2O$ |

The reaction mixture was heated at 240° C. for 1 hour under 35 psi nitrogen atmosphere, and then the pressure was lowered to atmospheric. Water was continuously distilled out during this period. Then 0.516 g of tris(-nonylphenyl)phosphite was added to the mixture in the reactor. The reaction temperature was increased to 250° C. and maintained for 20 minutes under nitrogen atmosphere. Then the nitrogen gas flow was stopped and a vacuum of less than 0.4 mm Hg was applied. The reaction was continued at 270° C. under less than 0.4 mm Hg for 5 hours. The copolyester had an inherent viscosity of 0.87. The glass transition temperature was 64° C. The $O_2$ and $CO_2$ gas permeabilities were 1.6 and 6.0 cc./mil per 100 in.$^2$/day/atm., respectively.

Such copolyesters as described for blending with PET according to the present invention are disclosed in U.S. Pat. No. 4,398,017 which is incorporated in full herein by reference.

In a preferred embodiment, the polyester-based intimate fusion blend composition comprises admixtures of PET from 50–90 weight percent and copolyester from 50–10 weight percent. The most preferred copolyester composition useful for admixing with the PET is a copolyester formed by reacting about 90 percent isophthalic acid and about 10 percent terephthalic acid with about 15 percent 1,3 bis(2-hydroxyethoxy)benzene, as illustrated in Example 12, such copolyester having a glass transition temperature of about 64° C., a $PO_2$ of about 1.6 cc./mil per 100 in.$^2$/day/atm. and a $PCO_2$ of about 6.0 cc./mil per 100 in.$^2$/day/atm. as exemplified above.

In the preparation of the virgin blends of the polyester-based intimate fusion blend compositions, the granular or flaked solid polymer is admixed by any conventional means, for example admixed in dry form and subsequent melt fusion blended by passing the granules through a conventional hot melt twin screw-type extruder.

Such material from the extruder can be directly extruded as film. In the alternative, in the preparation of blow-molded containers from the polyester based intimate fusion blend compositions according to the present invention, typically the material exiting from the above-referred to twin screw hot melt extruder will be forcibly injected into parison molds to form a parison and cooled to a degree wherein the parison maintains its shape. The parisons can be directly taken, while hot, to a blow molding station and inflated into oriented or unoriented containers. The parisons can also be cooled and collected for later blow-molding by the reheat and blow technique.

The preferred orientation temperature for the materials according to the present invention is on the order of 85°–110° C.

In the case of relatively thick sheet and relatively thin film forming from the polyester based intimate fusion blend compositions according to the present invention, conventional sheet and film forming devices and methods may be used. The material requires no special handling. The thick sheet stock can be converted by thermoforming to produce deep drawn food trays by conventional means while thin films may be extruded, stretch oriented and used as food wraps.

The polyester-based intimate fusion blend compositions according to the present invention, in additional to the polymeric components described above, may also contain minor amounts of colorants, inner-fillers, polymerization catalysts, cross-linking agents to improve melt strength, antioxidants, stabilizers, pigments and the like conventionally employed materials as mentioned above for the PET component of the blends.

To illustrate the superior gas barrier properties exhibited by the compositions of the present invention for use as sheet stock (useful for thermoformed containers) or thin film (useful for foodwrap), the preferred copolyester composition, exemplified above at Example 12, was admixed with PET at 10 and 20 weight percent of copolyester and 90 and 80 percent PET, respectively, in a conventional twin screw extruder and extruded conventionally into unoriented films. The extruded film was tested using a Mo Con Permatron C film analyzer at 73° F., under dry conditions, for $CO_2$ and $O_2$ barrier properties.

The extruded unoriented film described below in Tables I and II had the following gas permeabilities.

TABLE I

Carbon Dioxide Transmission Rate for Unoriented Extruded Film

| Sample | Composition (Wt. Percent) | Avg. Film Thickness (Mils) | $CO_2$ Gas Transmission Rate cc at STP/ 100 sq in/day/atm | $CO_2$ Permeability cc at STP/mil 100 sq in/day/atm |
|---|---|---|---|---|
| 1 | 100 PET | 13.9 | 3.82 | 53.1 |
| 2 | 100 PET | 13.5 | 3.76 | 50.7 |
| 3 | 100 PET | 13.4 | 3.75 | 50.2 |
| | average | 13.6 | 3.77 | 51.3 |
| 1 | 90 PET/10 Copolyester | 11.8 | 3.55 | 41.9 |
| 2 | 90 PET/10 Copolyester | 10.8 | 3.54 | 38.3 |
| 3 | 90 PET/10 Copolyester | 11.8 | 3.42 | 40.3 |
| | average | 11.5 | 3.50 | 40.2 |
| | Average barrier improvement over 100% PET = 22% | | | |
| 1 | 80 PET/20 Copolyester | 12.6 | 2.27 | |
| 2 | 80 PET/20 Copolyester | 11.6 | 2.77 | |
| | average | 12.1 | 2.52 | |

TABLE I-continued

Carbon Dioxide Transmission Rate for Unoriented Extruded Film

| Sample | Composition (Wt. Percent) | Avg. Film Thickness (Mils) | $CO_2$ Gas Transmission Rate cc at STP/ 100 sq in/day/atm | $CO_2$ Permeability cc at STP/mil 100 sq in/day/atm |
|---|---|---|---|---|
| | Average barrier improvement over 100% PET = 41% | | | |

TABLE II

Oxygen Transmission Rate for Unoriented Extruded Film

| Sample | Compositions (Wt. Percent) | Avg. Film Thickness (Mils) | Oxygen Permeability cc at STP/mil 100 sq in/day/atm |
|---|---|---|---|
| 1 | 100 PET | 13.9 | 8.9 |
| 2 | 100 PET | 13.5 | 9.9 |
| 3 | 100 PET | 13.4 | 9.5 |
| average | | 13.6 | 9.4 |
| 1 | 90 PET/10 Copolyester | 11.8 | 7.9 |
| 2 | 90 PET/10 Copolyester | 10.8 | 7.7 |
| average | | 11.3 | 7.8 |
| | Average barrier improvement over 100% PET = 17% | | |
| 1 | 80 PET/20 Copolyester | 12.6 | 6.1 |
| 2 | 80 PET/20 Copolyester | 11.6 | 7.4 |
| average | | 12.1 | 6.8 |
| | Average barrier improvement over 100% PET = 28% | | |

The data of Table I clearly indicates that the polyester based intimate fusion blend composition illustrated is substantially superior to PET in $CO_2$ barrier properties but do not significantly sacrifice mechanical properties. The 90/10 blends of PET and the preferred copolyester exemplified in Example 12 are about 22 percent better gas barriers to $CO_2$ transmission than PET. The 80/20 blends of PET and the preferred copolyester of Example 12 are about 41 percent better gas barriers to $CO_2$ transmission than PET. Unexpectedly, the blends are substantially superior than one would predict. FIG. 1 shows the relationship between $CO_2$ gas transmission versus percentage blends from pure PET to pure copolyesters. The theoretical gas transmission rate is represented by line A while the actual measured value for the blends is illustrated by line B. The actual values for reduced $CO_2$ transmission are substantially higher than predictable illustrating unexpected result in the blended compositions.

Figure 2:
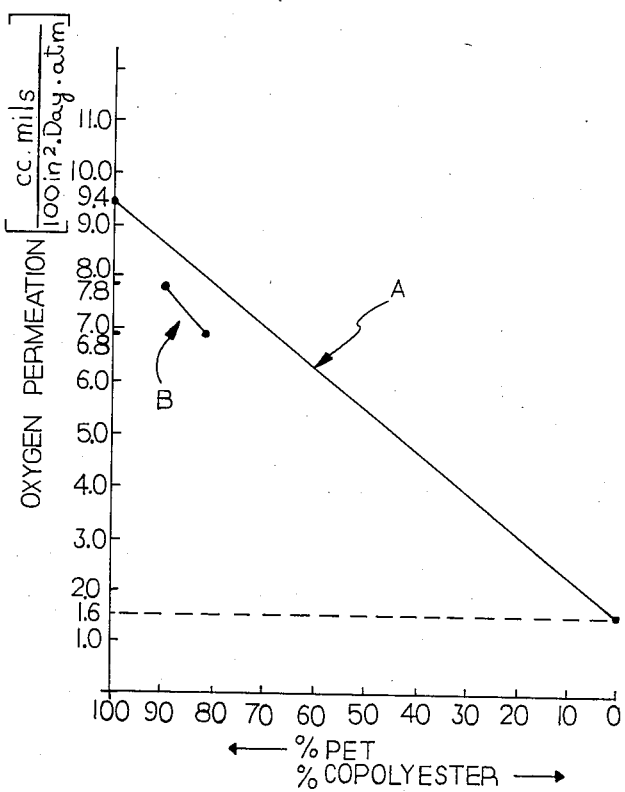
FIG. 2 is a graphical representation of the $O_2$ gas transmission characteristics of poly(ethylene terephthalate) and copolyester compared to the compositions according to the invention.

The data of Table II clearly indicates that the polyester based intimate fusion blend composition illustrated is substantially superior to PET in $O_2$ barrier properties. The 90/10 blends for PET and the preferred copolyester exemplified in Example 12 are about 17 percent better gas barriers to $CO_2$ transmission than PET. The 80/20 blends of PET and the preferred copolyester of Example 12 are about 28 percent better gas barriers to $O_2$ transmission than PET. Unexpectedly, the blends are substantially superior than one would predict. FIG. 2 shows the relationship between $O_2$ gas transmission versus percentage blends from pure PET to pure copolyesters. The theoretical gas transmission rate is represented by line A while the actual measured value for the blends is illustrated by line B. The actual values for reduced $O_2$ transmission are substantially higher than predictable illustrating unexpected results in the blended compositions.

Another important property of materials used for food and beverage packaging is the water vapor transmission rate.

Table III below illustrates the superior water vapor barrier characteristics of the present composition. The compression molded samples of unoriented material are fabricated from the preferred composition of Example 12 admixed with the specified amounts of PET and are tested. The water vapor transmission and water vapor permeability are determined gravimetrically using a commercially available Thwing-Albert cup at 73° F. at relative humidities between 50–100%.

The compression molded samples described below in Table III had the following water vapor transmission rates and water vapor permeability rates.

TABLE III

Water Barrier Properties For Unoriented Film

| Sample | Compositions (Wt. Percent) | Avg. Film Thickness (Mils) | Water Vapor Transmission 100 sq in/day | Water Vapor Permeability g/mils 100 sq in/day |
|---|---|---|---|---|
| 1 | 100 PET | 13.7 | 0.077 | 1.05 |
| 2 | 100 PET | 12.6 | 0.078 | 0.97 |
| 3 | 100 PET | 13.4 | 0.075 | 1.00 |
| Average | | 13.2 | 0.077 | 1.01 |
| 1 | 90 PET/10 Copolyester | 11.6 | 0.071 | 0.825 |
| 2 | 90 PET/10 Copolyester | 10.7 | 0.082 | 0.872 |
| 3 | 90 PET/10 Copolyester | 11.8 | 0.076 | 0.898 |
| Average | | 11.3 | 0.076 | 0.865 |
| | Average water barrier improvement over 100% PET = 14% | | | |
| 1 | 80 PET/20 Copolyester | 12.9 | 0.054 | 0.700 |
| 2 | 80 PET/20 Copolyester | 11.2 | 0.068 | 0.760 |
| Average | | 12 | 0.061 | 0.730 |
| | Average water barrier improvement over 100% PET = 28% | | | |

The data of Table III clearly indicates that the polyester based intimate fusion blend compositions illustrated is significantly superior to PET in water barrier properties. The 90/10 blends of PET and the preferred copolyester exemplified in Example 12 are about 14 percent better water barriers than PET. The 80/20 blends of PET and the preferred copolyester of Example 12 are about 28 percent better in water barrier properties than PET.

To demonstrate that the compositions according to the present invention show significantly improved carbon dioxide, water and oxygen barrier properties but does not significantly sacrifice mechanical properties, compression molded films were tested to determine the important mechanical properties of elastic modulus, yield stress, yield strain, ultimate strength and ultimate elongation. The results set forth below and are, as before, for PET-copolyester blends employing the preferred copolyester of Example 12.

TABLE IV

Mechanical Properties of Unoriented Film

| Property | | 100 PET | 90 PET-10 Copolyester | 80 PET-20 Copolyester |
|---|---|---|---|---|
| Elastic Modulus | average | 312 | 335 | 344 |
| PSI × 1000 | deviation | 9 | 8 | 15 |
| Yield Stress | average | 7.9 | 8.6 | 9.3 |
| PSI × 1000 | deviation | 0.1 | 0.3 | 0.2 |
| Yield Strain | average | 3.4 | 3.4 | 3.5 |
| in Percent | deviation | 0.2 | 0.2 | 0.2 |
| Ultimate Strength | average | 9.6 | 7.5 | 7.4 |
| PSI × 1000 | deviation | 1.3 | 0.7 | 1.0 |
| Ultimate | average | 326 | 245 | 231 |
| Elongation in Percent | deviation | 61 | 28 | 55 |

Composition (Wt. Percent)

Each test was completed using five different specimens with a stretch rate of 0.2 inches per minutes and under conditions of ASTM test 1822.

Note that both the 90/10 and 80/20 blends of PET and copolyester according to the invention maintain or show improved elastic modulus, yield stress and yield strain compared to 100 percent PET and sacrifice only slightly in ultimate strength and ultimate elongation.

Quite unexpectedly, overall the composition exemplified above according to the present invention maintains most mechanical properties and show significantly improved barrier properties.

As pointed out above, the polyester-based intimate fusion blend compositions according to the present invention are wellsuited for the formation of thermoplastic container parisons and the resulting containers, which containers may occur in multiple embodiments.

Figure 3:
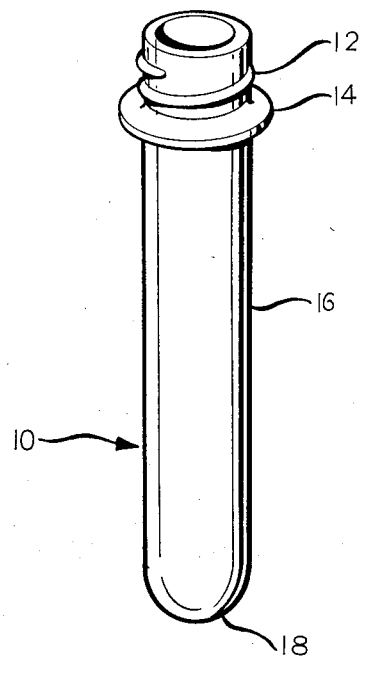
FIG. 3 is a perspective view of a parison according to the present invention.

FIG. 3 is a perspective view of a thermoplastic parison according to the present invention wherein the parison 10 includes a threaded finish portion 12, an outstanding handling ledge 14 depending downwardly from and integral with the threaded finish portion 12, a main body portion 16 depending downwardly from and integral with the handling ledge 14 and a closed bottom portion 18 integral with and downwardly depending from the main body portion 16. The parison 10 is conveniently formed by well-known injection molding techniques using the polyester-based intimate fusion blend composition according to the present invention without any special conditions or equipment requirements.

Figure 4:
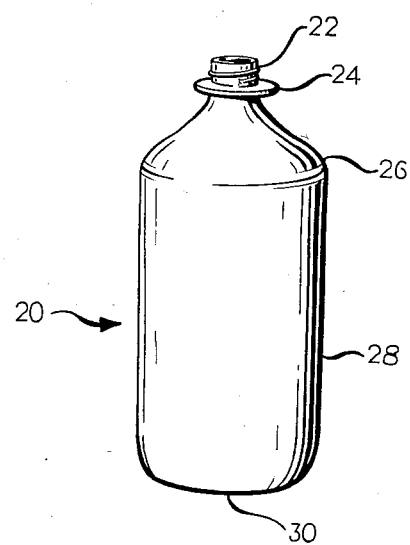
FIG. 4 is a perspective view of one embodiment of a container according to the present invention, namely a bottle.

The parison illustrated in FIG. 3 may be blow-molded by conventional blow-molding techniques to form a first embodiment of the container according to the present invention as shown at FIG. 4 represented by the bottle 20. The bottle 20 includes a threaded finish portion 22, a handling ledge 24, which is integral with and downwardly depending from the threaded finish portion 22 and further includes an outwardly sloping shoulder portion 26 which is integral with and downwardly depending from the handling ledge 24. A main body portion 28 is integral with and downwardly depending from the shoulder 26. A closed bottom portion 30 is formed integral with and downwardly depending from the main body portion 28 and serves to completely close the bottom of the bottle 20.

Figure 5:
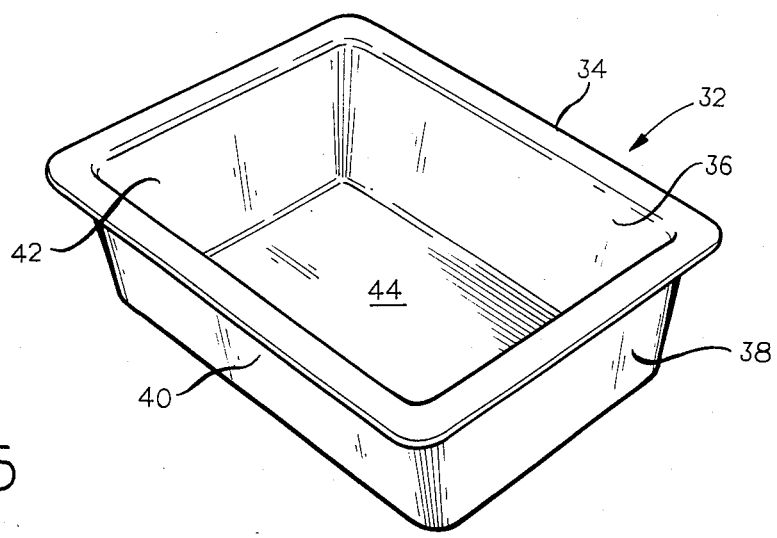
FIG. 5 is a perspective view of another embodiment of a container according to the present invention, namely a deep drawn food tray.

An alternative embodiment of a container according to the present invention which can be made from extruded sheet formed of the polyester-based intimate fusion blend composition according to the present invention is illustrated at FIG. 5 by a deep-drawn food tray 32. The food tray 32 includes a flat upper sealing rim 34 which is typically a substrate upon which a conventional foil closure is sealed with conventional adhesives to form a closed package for containing foodstuffs. Downwardly depending from and integral with the sealing rim 34 are a plurality of interconnecting side panels, namely the side panels 36, 38, 40 and 42. A centrally located bottom portion 44 is formed integral with and generally perpendicular to the interconnected side panels 36, 38, 40 and 42 to form a completely sealed bottom portion of the food tray 32.

All patents and documents referred to herein are hereby incorporated by reference.

Having disclosed my invention, what I claim is:

1. A container comprising:
an open top portion;
an enclosed main body portion integral with and downwardly depending from said open top portion;
an enclosed bottom portion integral with and downwardly depending from said enclosed main body portion, said container fabricated from an intimate fusion blend of
   (1) a poly(ethylene terephthalate); and
   (2) a copolyester formed of the polymeric reaction product of
      (A) reactant(s) selected from isophthalic acid, terephalic acid, and their $C_1$ to $C_4$ alkyl esters, and any mixture thereof in any proportion,
      (B) reactants, 1,3 bis(2-hydroxyethoxy)benzene plus ethylene glycol, and optionally one or more other ester forming dihydroxy organic hydrocarbon reactant(s), and optionally,
      (C) reactant, bis(4-beta-hydroxyethoxyphenyl) sulfone, wherein:
         (1) the amount of said 1,3 bis(2-hydroxyethoxy)benzene is 5–90 mole percent of the amount of A reactants,
         (2) the combined amount of B and C reactants, is about 110 to 300 mole percent of the amount of A reactants,
         (3) the amount of said other ester forming dihydroxy organic hydrocarbon reactant(s) is zero to 20 mole percent of the amount of said A reactants, and
         (4) the combined amount of said (C) reactant plus said 1,3 bis(2-hydroxyethoxy)benzene and said other ester forming dihydroxy organic hydrocarbon reactant(s) is not over 90 mole percent of said A reactants.

2. A container preform comprising:
a threaded finish portion;
a main body portion integral with and downwardly depending from said threaded finish portion; and
a closed bottom portion integral with and downwardly depending from said main body portion, said preform fabricated from an intimate fusion blend of
   (1) a poly(ethylene terephthalate); and (2) a copolyester formed of the polymeric reaction product of
  (A) reactant(s) selected from isophthalic acid, terephalic acid, and their $C_1$ to $C_4$ alkyl esters, and any mixture thereof in any proportion,
  (B) reactants, 1,3 bis(2-hydroxyethoxy)benzene plus ethylene glycol, and optionally one or more other ester forming dihydroxy organic hydrocarbon reactant(s), and optionally,
  (C) reactant, bis(4-beta-hydroxyethoxyphenyl) sulfone, wherein:
    (1) the amount of said 1,3 bis(2-hydroxyethoxy)benzene is 5–90 mole percent of the amount of A reactants,
    (2) the combined amount of B and C reactant is about 110 to 300 mole percent of the amount of A reactants,
    (3) the amount of said other ester forming dihydroxy organic hydrocarbon reactant(s) is zero to 20 mole percent of the amount of said A reactants, and
    (4) the combined amount of said (C) reactant plus said 1,3 bis(2-hydroxyethoxy)benzene and said other ester forming dihydroxy organic hydrocarbon reactant(s) is not over 90 mole percent of said A reactants.

3. A container according to claim 1, wherein said intimate fusion blend contains from 50 to 90 weight percent of poly (ethylene terephthalate) and from 10 to 50 weight percent of said copolyester.

4. A container according to claim 1, wherein said intimate fusion blend contains from 80 to 90 weight percent of said poly (ethylene terephthalate) and from 10 to 20 weight percent of said copolyester.

5. A container preform according to claim 2, wherein said intimate fusion blend contains from 50 to 90 weight percent of said poly (ethylene terephthalate) and from 10 to 50 weight percent of said copolyester.

6. A container preform according to claim 3, wherein said intimate fusion blend contains from 80 to 90 weight percent of said poly (ethylene terephthalate) and from 10 to 20 weight percent of said copolyester.

7. A composition of matter comprising:
an intimate fusion blend of:
  (1) a poly(ethylene terephthalate); and
  (2) a copolyester formed of the polymeric reaction product of,
    (A) reactant(s) selected from isophthalic acid, terephalic acid, and their $C_1$ and $C_4$ alkyl esters, and any mixture thereof in any proportion,
    (B) reactants, 1,3 bis(2-hydroxyethoxy)benzene plus ethylene glycol, and optionally one or more other ester forming dihydroxy organic hydrocarbon reactant(s), and, optionally,
    (C) reactant, bis(4-beta-hydroxyethoxyphenyl) sulfone, wherein:
      (1) the amount of said 1,3 bis(2-hydroxyethoxy)benzene is 5–90 mole percent of the amount of A reactants,
      (2) the combined amount of B and C reactant is about 110 to 300 mole percent of the amount of A reactants,
      (3) the amount of said other ester forming dihydroxy organic hydrocarbon reactant(s) is zero to 20 mole percent of the amount of said A reactants, and
      (4) the combined amount of said (C) reactant plus said 1,3 bis(2-hydroxyethoxy)benzene and said other ester forming dihydroxy organic hydrocarbon reactant(s) is not over 90 mole percent of said A reactants.

8. A composition of matter according to claim 7, wherein said composition contains from 50 to 90 weight percent of said poly (ethylene terephthalate) and from 10 to 50 weight percent of said copolyester.

9. A composition of matter according to the claim 7, wherein said composition contains from 80 to 90 weight percent of said poly (ethylene terephthalate) and from 10 to 20 weight percent of said copolyester.

10. A sheet or film having the composition of claim 7.

11. A sheet or film according to claim 10, wherein said composition contains from 50 to 90 weight percent of said poly (ethylene terephthalate) and from 10 to 50 weight percent of said copolyester.

12. A sheet of film according to claim 10, wherein said composition contains from 80 to 90 weight percent of said poly (ethylene terephthalate) and from 10 to 20 weight percent of said copolyester.

13. A deep drawn tray having the composition of claim 7.

14. A deep drawn tray according to claim 13 wherein said composition contains from 50 to 90 weight percent of said poly (ethylene terephthalate) and from 10 to 50 weight percent of said copolyester.

15. A deep drawn tray according to claim 13, wherein said composition contains from 80 to 90 weight percent of said poly (ethylene terephthalate) and from 10 to 20 weight percent of said copolyester.

* * * * *